2,868,649

METHOD FOR THE PRODUCTION OF BAKER'S YEAST

Sven Olof Rosenqvist, Rotebro, Sweden, assignor to Svenska Jastfabriks Aktiebolaget, Stockholm, Sweden, a corporation of Stockholm No Drawing. Application December 14, 1955
Serial No. 552,975

3 Claims. (Cl. 99—96)

In the production of compressed yeast (baker's yeast) it is usual as a first step to concentrate the fermented wort from a yeast vat in one or more separators, whereafter the resulting concentrate is diluted with water, either directly or in a special container. Then, as another step, a new concentration is obtained by separation in one or more separators. Mostly a further dilution with water and subsequent separation is undertaken as third step, and thus the yeast is washed twice altogether. The yeast concentrate of the last separation step is conveyed in an intermediate container to a filter press or a continuous filter from which it is delivered in the desired condition.

Careful washing is essential in such a process to maintain the quality of the yeast and properties such as stability and colour. Also, filtration on a continuous filter using the usual methods would be very difficult to carry out. In literature describing this process it is stated that in order to carry out effective filtration of yeast on a suction filter, the yeast first must be washed very carefully with quantities of water up to 4 liters per kilogram of yeast. If this is not done the quality of the yeast is endangered and the filter holes are blocked by particles from the fermented wort.

The main object of the invention is to simplify the process for the production of yeast by eliminating one or more of the washes in separators. According to the invention, yeast concentrate is dehydrated on a continuous or travelling filter until it is in cake form, whereafter the yeast on the filter is washed with water one or more times, and the water is then entirely or partially removed through the filter. In the preferred method of the invention, the yeast concentrate resulting from the first step as well as residues of the concentrate contained in the fermented wort are not subjected to a new wash and separation in a separator, but are conveyed to a continuous filter, directly or in certain cases by an intermediate container. Washing on the filter should take place quickly in a matter of one or several minutes or a fraction of a minute. The introduction of water to the filter quickly frees the yeast from its wort residues and also continuously cleans the filter cloth.

In certain cases it has proved expedient to rinse the filter cloth with highly pressurized water immediately after scraping the yeast from the filter so that the cloth is cleaned before new yeast is introduced during the continued travel of the filter. Alternatively, such cleansing with pressurized water can take place periodically at intervals of 15 to 60 minutes or more. The cleansing apparatus can be fully automatic so that a water nozzle moves up and down along a delivery portion of the filter.

The method of the invention considerably simplifies the process and a minimum number of separators is required. Further, the quantity of water required for washing the yeast is much smaller since the yeast is washed only after it has assumed a solid shape, and thus the amount of wort residue, which is to be removed by the water, is also much less.

Usually, fermentation in the final fermenting vat is carried out in a 15 or 20 times diluted solution of the molasses. By altering the dilution and the quantity of washing water, as well as the period of washing, one can obtain yeast having a smaller water content and different consistency. To obtain a very low water content in the finished yeast, dilution can be considerably below 15 times down to about 3 times.

Another method for changing the water content of the finished yeast consists of conveying wort already removed from the yeast back to the yeast vat and using this wort as diluting water for the molasses or the starting material for fermentation. By reason of the fact that the fermented wort released from the yeast originates from a solution in which the wort was used earlier as a diluent, important concentrations of materials other than sugar compounds can be present in the molasses. In certain cases this has proved advantageous with regard to the quality of the yeast, quicker baking times, etc. The same effect is produced by fermenting weaker dilutions, that is to say, the concentration of salts and electrolytes in the wort is increased, whereby the osmotic requirements are favourable before the wash on the filter.

Another aspect of the invention is in the fact that only a later part of the wash is performed on the filter so that fermented wort with its yeast is subjected first to a concentration and then a quick wash, for example in a separator, whereafter the last wash follows as one or more steps on a filter. During the wash on the filter, special materials can be added to the water for improving the quality of the yeast, for example alcohols and salts such as phosphates.

*Example*

Yeast suspension was taken from a fermenting vat in which the dilution (ratio between volume of the original concentrated molasses wort and the wort in the final stage of the fermentation) was 1:15, containing about 98–98.5% water. The suspension was concentrated in separators to about an 84% water content without washing and then supplied to the filter surface of a cylindrical vacuum drum filter having a diameter of 2 m. and rotating at a speed of 3.3 revolutions per minute corresponding to a speed of the filter surface of 21 meters per minute. In a first step the yeast on the filter is dehydrated to about a 73% content of water. Washing of the yeast with water was then effected on about ¼ of the circumferential length of the filter surface. The quantity of water supplied to the yeast on the filter for washing was about 750 to 1,000 liters/hour and the time of washing about 5 to 10 seconds. The yeast was then dehydrated on the same filter to about a 73% content of water.

The following table shows the water content and consistency values obtainable at different vacuum pressures in the drum

| Test | vacuum pressure, kg./cm.² | consistency value | percentage of water |
|---|---|---|---|
| 1 | 0.55 | 63 | 73.1 |
| 2 | 0.70 | 75 | 72.5 |
| 3 | 0.85 | 80 | 72.2 |

The consistency was measured in a consistency meter in which the value 100 indicates solid state. A lower value indicates a less solid consistency.

As a comparison it could be mentioned that if the yeast was washed in separators in conventional manner the consistency was 57 to 60 and the water content 73 to 74% at a vacuum of 0.85 kg./cm.². Thus, the consistency value and the water content obtained by the method according to the present invention were more favourable.

The yeast washed on the filter according to tests 1, 2 and 3 had the following color values:

| Test: | Color |
|---|---|
| 1 | 100 |
| 2 | 97 |
| 3 | 108 |

The color was measured in a color measuring apparatus in which the color of the yeast was compared with the color of a plate of barium sulfide. A higher color value indicates a higher whiteness.

What I claim is:

1. A method for production of propagative baker's yeast consisting essentially of the steps of separating solid yeast from a wort without dilution thereof containing fermented yeast to obtain therefrom in its natural state after fermentation a yeast concentrate, subsequently dehydrating residual wort from said concentrated yeast by filtering it off into cake form, then washing said yeast cake with water at least once, and removing said water through said filtering zone.

2. A method according to claim 1, in which the yeast concentrate after separation thereof is subjected to a pre-wash between said separation of the yeast concentrate and dehydration thereof by filtration to form a filter cake, and in which a final wash of said filter cake takes place.

3. A method for production of baker's yeast consisting essentially of the steps of fermenting a quantity of fermented wort including as an ingredient thereof residual liquor drawn off from a preceding fermentation, separating an unwashed yeast concentrate from the wort after fermentation without dilution of said wort, returning residual liquor separated from the yeast concentrate to act as an ingredient of the wort during the fermentation of a subsequent quantity of fermented wort, conveying said yeast concentrate to a continuously operating filter zone for dehydrating residual wort from said yeast to convert it into cake form, washing said yeast cake in said filter zone with water at least once and removing the water through said filter zone.

References Cited in the file of this patent

UNITED STATES PATENTS

| 412,968 | Mildenberger | Oct. 15, 1889 |
| 2,521,706 | Fischer | Sept. 12, 1950 |
| 2,609,328 | Reed | Sept. 2, 1952 |

OTHER REFERENCES

Kustler et al.: Copy of Austrian patent application. (Copy received in the Patent Office prior to April 15, 1955.)